Jan. 13, 1931.  C. M. MARSH  1,789,242
FRONT WHEEL STEER AND DRIVE UNIT
Filed April 20, 1926  3 Sheets-Sheet 1

Inventor
Clifford M. Marsh
By
Attorney

Jan. 13, 1931.  C. M. MARSH  1,789,242
FRONT WHEEL STEER AND DRIVE UNIT
Filed April 20, 1926  3 Sheets-Sheet 2
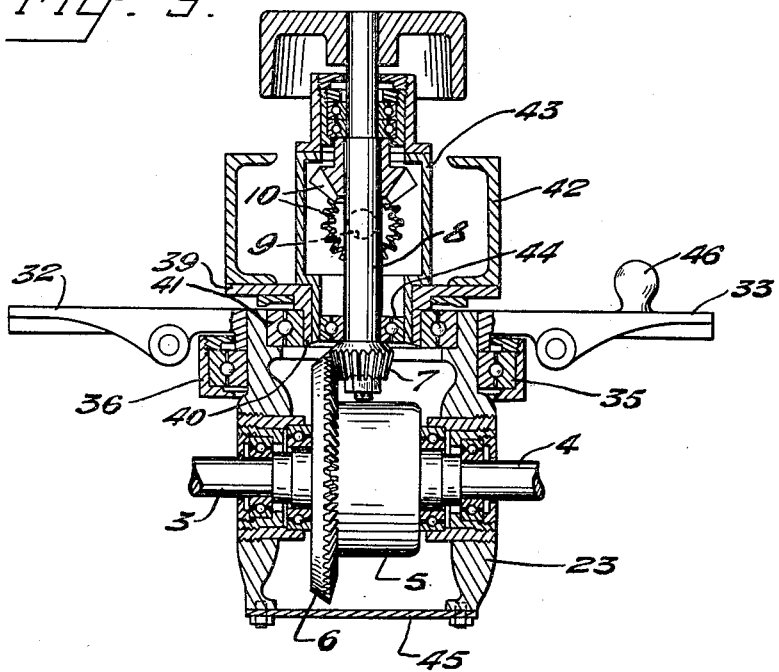
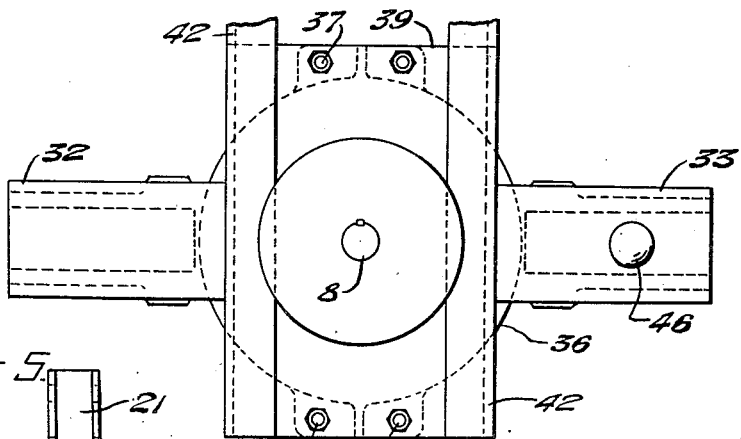
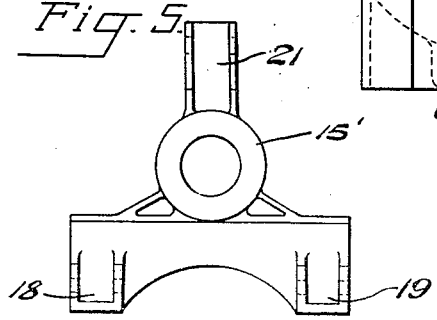
Inventor
Clifford M. Marsh
By
Attorney

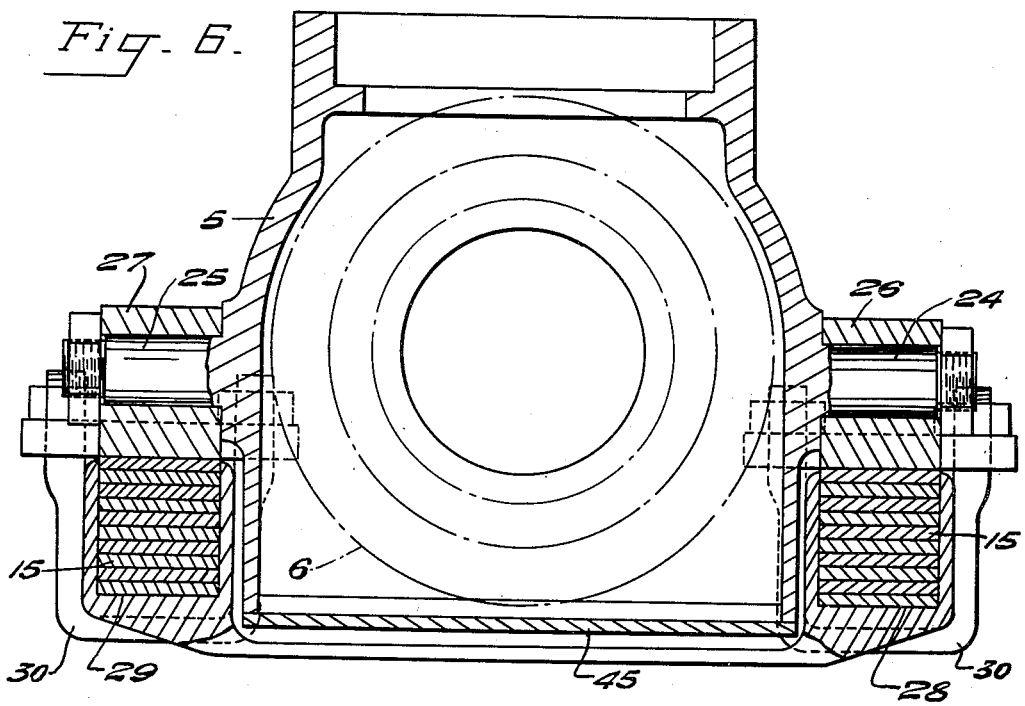
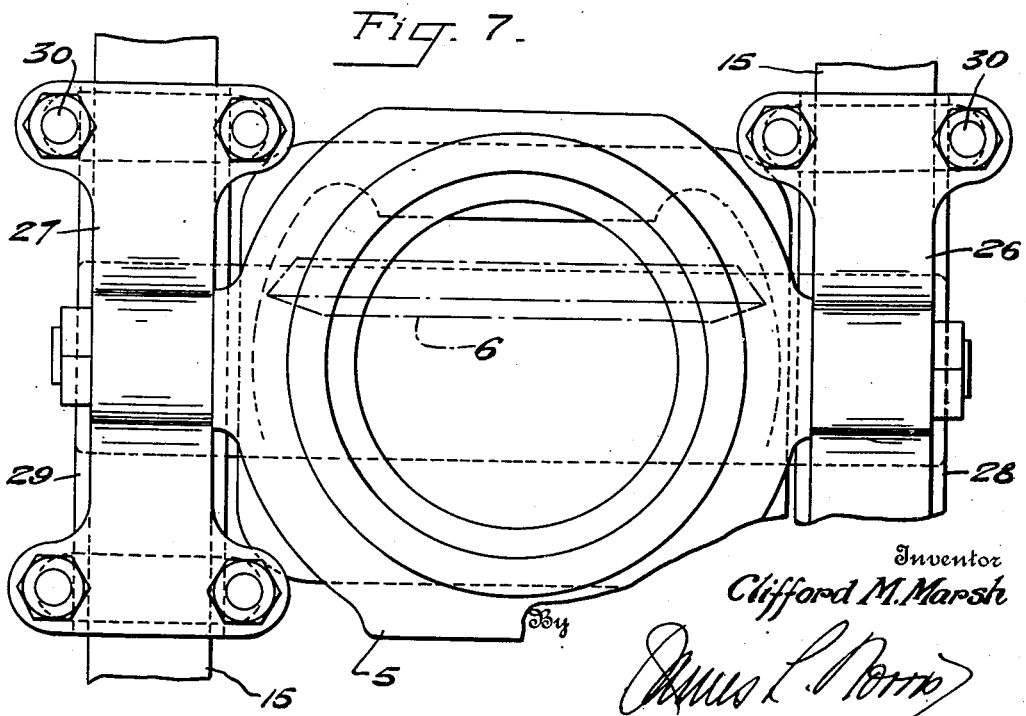

Patented Jan. 13, 1931

1,789,242

UNITED STATES PATENT OFFICE

CLIFFORD MYRAM MARSH, OF GLENS FALLS, NEW YORK

FRONT-WHEEL STEER AND DRIVE UNIT

Application filed April 20, 1926. Serial No. 103,310.

This invention relates to front wheel steer and drive units for auto vehicles, and is an improvement upon the invention disclosed in my pending application No. 645,374, filed June 14, 1923.

The apparatus in which the present invention is embodied is similar to the device of said pending application to the extent that it provides a dirigible unit rotatable about the axis of the propeller shaft, said axis being slightly closer to one of the dirigible wheels than the other so that said wheels travel through unequal arcs in steering, causing the differential to operate in such direction as to off-set the driving torque transmitted from the propeller shaft to the ring gear, thereby freeing the steering operation from the resistance of said driving torque.

The present invention concerns itself primarily with the provision of a flexible axle consisting of springs supporting the axle shafts and dirigible wheels, said springs being pivotally secured to the casing of the differential, which member acts as the rotatable element of the fifth wheel construction.

One of the objects of the invention is to provide means for maintaining the chassis or vehicle body substantially level notwithstanding that one of the dirigible wheels may be supported upon a considerably higher elevation than the other.

Another object of the invention is to provide means for maintaining the dirigible wheels substantially in vertical planes, regardless of the inclination of the flexible axle due to difference in the level of the ground upon which the wheels rest.

A further object of the invention is to provide a flexible axle consisting of main spring members, which ordinarily bear the load, and auxiliary spring members normally acting as tie-rods to hold the wheels substantially in vertical planes, but assisting in supporting the load when extraordinary load is imposed upon the axle, or when the latter is inclined to an excessive degree by difference in the road level upon which the dirigible wheels rest.

Still another object of the invention is the provision of means whereby the load is at all times substantially equally shared by each of the dirigible wheels.

Other objects of the invention will appear as the following description of an illustrative embodiment thereof proceeds.

In the drawings:—

Fig. 3 is a front sectional view through the gear casings of both fifth wheel members.

Fig. 4 is a plan view of a portion of the upper fifth wheel member, showing the lateral abutments for the auxiliary springs.

Fig. 5 is a side elevation of one of the front wheel bearing blocks.

Fig. 6 is a vertical section through the differential casing showing the pivotal support for the main springs.

Fig. 7 is a plan view of the structure shown in Fig. 6, a part being broken away.

Figure 1:
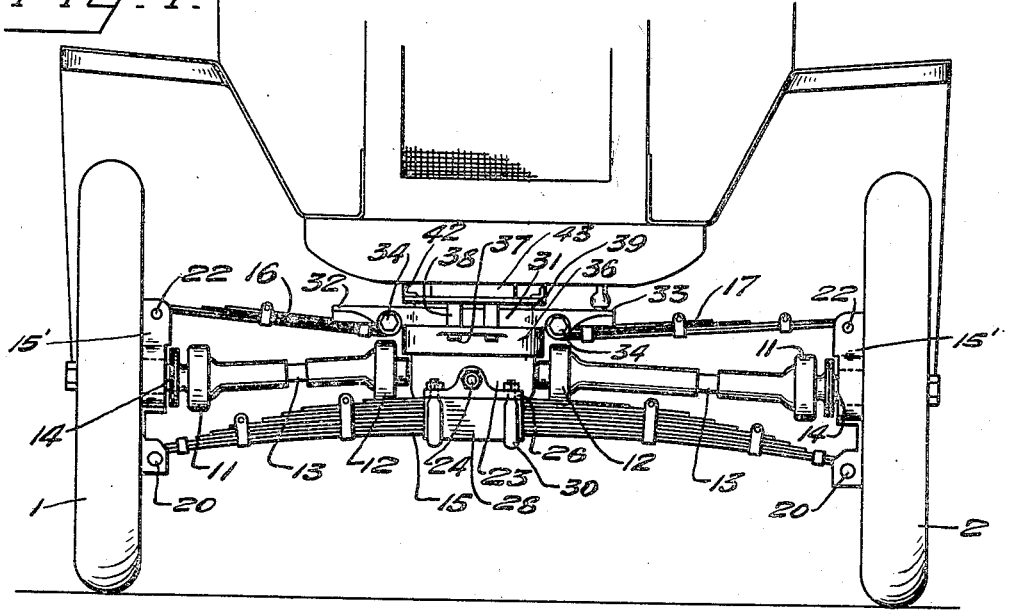
Fig. 1 is a front elevation of an automobile showing my improved steer and drive unit in symmetrical position.
Figure 2:
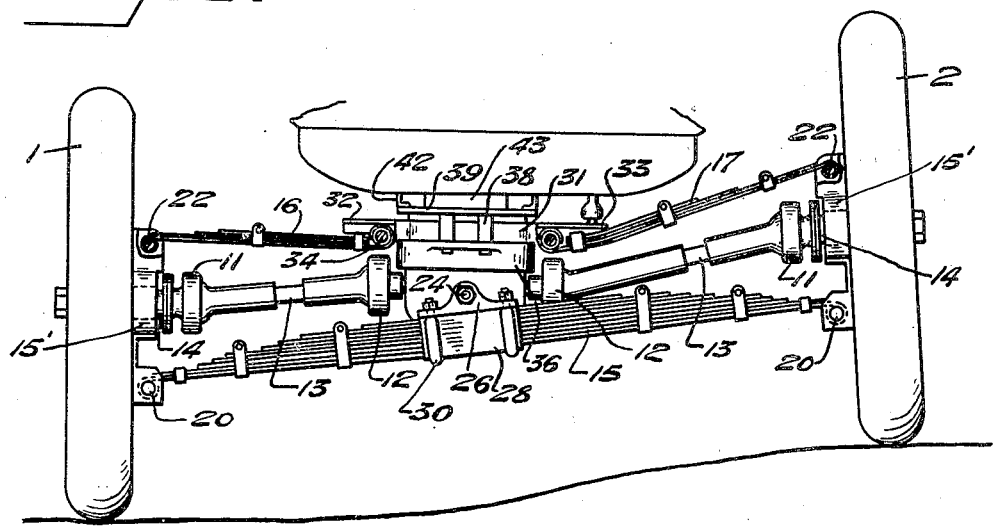
Fig. 2 is a similar view showing the relative positions assumed by the several parts when one wheel rests at a higher level than the other.

Referring now in detail to the several figures, and first adverting to the general assemblage views shown in Figs. 1 and 2 and the sectional view shown in Fig. 3, the numerals 1 and 2 represent the vehicle wheels of my improved steer and drive unit, the same constituting the front dirigible wheels of the auto vehicle. Said wheels are driven through articulated axle shafts 3 and 4 which are driven through a differential 5 of usual construction, Fig. 3, from a ring gear 6 receiving power from a pinion 7 at the end of a vertical propeller shaft 8 to which the driving torque is transmitted from the horizontal engine shaft 9 through the bevel gear set 10.

The articulated axle shafts each include universal joints 11 and 12, and a splined section 13, so that the axle shafts are quite flexible, both laterally of their axes, and longitudinally.

The end sections 14 of the axle shafts constitute stub shafts upon which the wheels are fixedly mounted, said stub shafts being journalled in bearing blocks which are positioned adjacent to but independently of the wheels.

The bearing blocks form the end members of a flexible axle constituted by the main leaf springs 15, the auxiliary leaf springs 16 and 17, and the associated parts to which said leaf springs are anchored.

It will be noted from Fig. 5 that each of the bearing blocks 15' is formed with a pair of lower spring seats 18 and 19 into which the ends of the main leaf springs extend and through which the spring bolts 20 pass which anchor the main springs to the bearing blocks. The bearing blocks are also formed each with an upper spring seat 21, receiving the outer end of one of the auxiliary springs 16 or 17, the same being anchored to the bearing block by means of a spring bolt 22.

The main springs 15, at their central portions, and the auxiliary springs at their inner ends are related in a novel manner to the rotatable member of a fifth-wheel construction constituted by the differential casing 23, and its appurtenant parts, the same being described as follows.

The casing 23 is provided, forwardly and rearwardly with studs 24 and 25 upon which are freely mounted the spring hangers 26 and 27. A spring cradle extends beneath the differential casing and upwardly at the front and back thereof into a position of registry with the spring hangers, said cradle being formed with channels 28 and 29 in which the main leaf springs 15 are retained, the spring cradle being secured at opposite ends of its channeled parts to the spring hangers 26 and 27, respectively, by suitable means such as the U-bolts 30, shown in Figs. 1, 2 and 7, the main springs being held thereby clampingly in position. By virtue of this mounting of the main leaf springs relative to the differential casing they are free to swing transversely of the vehicle about the pivotal axis afforded by the studs 24 and 25, when one of the front wheels rests upon a higher elevation than the other, the frame or body of the vehicle being maintained level as shown, so that the weight thereof is equally borne by the two wheels. The leaf springs 15 and the cradle thus form a support for the differential casing 23.

A collar 31 is formed unitarily with the differential casing, said collar being provided with lateral extensions 32 and 33, the same constituting spring perches to which the inner ends of the auxiliary springs 16 and 17 are pivotally secured as by the bolts 34. The auxiliary springs remain unflexed under ordinary conditions, and under extraordinary conditions, that is to say, when an abnormally heavy load is imposed upon the steer and drive unit, or when one wheel is elevated to an excessive height, both extensions 32 and 33, or, as the case may be, that extension 32 or 33 which lies on the same side as the elevated wheel, serve as abutments which the auxiliary springs engage, causing a flexure of said springs so that they then assist the main springs in sustaining the weight of the vehicle. Under ordinary conditions when the auxiliary springs do not engage the abutments, they act merely as tie rods for maintaining the bearing blocks 15' and the wheels in their proper planes. It is clear that without these the rods or their equivalent the wheels could not be maintained erect, since the axle shafts are elongatable and the main springs 15 are pivotally connected to said bearing blocks. It is also to be noted that while there are two spaced parallel main springs 15, there is but one auxiliary spring 16 or 17 connected to each bearing block, a three point suspension of the springs from the bearing blocks being obtained, rendering said bearing blocks extremely flexible in accommodating themselves to the transmitted strains of road vibrations. The spaced relation of the main springs, too, affords a wide base of support for the vehicle wheels, so that, although the axle constituted by the springs is thoroughly resilient, yet there is no tendency of the same to turn under, that is to say, to twist along an axis transversely of the vehicle.

The maintenance of the wheels in substantially vertical planes under all conditions of road level causes the weight of the load to be borne by the wheels in the planes of their spokes or webs, in which planes the wheels are strongest, instead of being directed angularly to the planes of said spokes or webs, as would be the case if the wheels tilted with the axle.

It will be noted from Fig. 2 that the flexure of the spring 17 about the point at which it engages the extension 33 causes a shortening of said spring which draws in the top of the adjacent wheel 2 causing the bottom of said wheel to move laterally outwardly. At the same time, the opposite wheel 1 is held from lateral inclination by the spring 16, acting as a tie rod, the result being a slight spread in the distance apart of the front wheels. This is allowed for by the spline sections 13 of the axle shafts, which permit their elongation, and by the flattening of the main springs 15. The angular deflection of the front wheel 2 when the spring 17 is flexed is shown to an exaggerated degree in Fig. 2. In actual practice the amount of said deflection is so slight as to be unnoticed by the eye when the vehicle is in motion, and is taken care of in lateral deformation of the tires instead of causing lateral slippage between the tires and the ground.

The differential casing 23 which with the collar 31 carrying the extensions 32 and 33, forms a rotatable part of the fifth wheel construction, revolves within an annular bearing 35 carried by a housing 36, the latter being fixed to the stationary part of the fifth wheel construction by means of bolts 37 which preferably pass through spacing members 38. The stationary part of the fifth wheel construction includes a plate 39 having a tubular flange 40 which extends within the upper end of the differential casing and forms with the inner wall of said casing a housing for an internal bearing 41 between which and the housing 36 the differential casing revolves. The object of the spacers 38 is to separate the plate 39 from the housing 36, leaving a space at each side through which the extensions 32 and 33 project. The plate 39 is suitably secured to frame members 42 or other parts which may be made rigid with the chassis of the auto vehicle.

The propeller shaft 8 and the gear set 10 through which power is transmitted from the engine drive shaft are conveniently housed in a casing 43, the lower end of which extends into the tubular flange of the plate 39, affording a seat for a bearing 44 of the propeller shaft. Said bearing is preferably in the plane of the bearing 41.

The differential casing may have a detachable bottom plate 45 through which the differential may be dropped for repair after the axle shafts and the inner bearings have been removed. The extension 33 is provided with a knob 46, the same forming part of the ball joint by means of which the rotatable portion of the fifth wheel construction is connected to the steering control mechanism. Since, in the preferred form of my invention the axle shafts are of unequal lengths in order to compensate for the driving torque, the main springs on one side of its pivotal connection with the differential casing is longer than on the other side thereof, and the auxiliary spring 17 is of correspondingly greater length than the auxiliary spring 16.

While I have in the above description disclosed what I believe to be a preferred and practical embodiment of my invention, it is to be understood that the specific details described are not limitative in their effect upon the invention but merely illustrative except in so far as they are expressly prescribed by the terms of the appended claims.

Having described my invention what I claim as new and desire to secure by Letters Patent, is:—

1. A front wheel steer and drive unit for auto vehicles including a differential casing rotatable on a vertical axis, a pair of parallel springs spaced apart and pivotally mounted upon said differential casing to swing bodily on a single axis longitudinally of said vehicle and passing through points on said springs unequally distant from their ends, bearing blocks at the ends of said springs and to which the latter are pivotally attached, articulated axle shafts extending from said differential casing and journalled in said bearing blocks, and vehicle wheels carried at the ends of said shafts adjacent said bearing blocks.

2. A front wheel steer and drive unit for auto vehicles including a differential casing rotatable on a vertical axis, a pair of parallel leaf springs spaced apart and pivotally mounted upon said differential casing to swing bodily on a single axis longitudinally of said vehicle, bearing blocks at the ends of said springs and to which the latter are pivotally attached, articulated axle shafts extending from said differential casing and journalled in said bearing bocks, vehicle wheels carried at the ends of said shafts adjacent said bearing blocks, and auxiliary springs each pivotally attached at one of its ends to one of said bearing blocks above the axle shaft associated with such block and having its opposite end pivotally attached to structure unitary with said differential casing outwardly of the point at which said leaf springs are pivoted to said casing, said auxiliary springs normally acting as radius rods to hold said vehicle wheels substantially in vertical planes.

3. A front wheel steer and drive unit for auto vehicles including a differential casing, an axle including a pair of parallel leaf springs spaced apart, extensions from the front and rear of said differential casing to which said springs are pivotally mounted, bearing blocks at the ends of said springs to which the ends of the latter are pivotally attached, articulated axle shafts extending from said differential casing and journalled in said bearing blocks, vehicle wheels carried at the ends of said shafts adjacent said bearing blocks, and auxiliary springs pivotally attached at their ends to said bearing blocks above said axle shafts and to structure unitary with said differential casing, said structure including lateral extensions against which said auxiliary springs abut when the main springs are abnormally loaded, thereby transforming the pivotal motion of said auxiliary springs into flexion of the same, in a direction to cause them to assist in the support of the load.

4. A front wheel steer and drive unit for auto vehicles including a differential casing, an axle including a pair of parallel leaf springs spaced apart and pivotally mounted upon said differential casing to swing on an axis longitudinally of said vehicle, bearing blocks at the ends of said springs to which the latter are pivotally attached, articulated axle shafts extending from said differential casing and journalled in said bearing blocks, vehicle wheels carried at the ends of said shaft adjacent said bearing blocks, auxiliary springs pivotally attached at one end to said bearing blocks above said axle shafts and at the other end to structure unitary with said differential casing and normally acting as tie rods, a propeller shaft for driving said articulated axle shafts, said steer and drive unit being rotatable about said shaft, one of said articulated axle shafts being longer than the other to neutralize the effect of said driving torque upon the act of steering, the main springs and auxiliary spring being correspondingly longer on the same side of said casing as said longer axle shaft than on the opposite side of the casing.

5. A front wheel steer and drive unit for auto vehicles including a differential casing, said casing being formed with studs projecting forwardly and rearwardly, a pair of parallel leaf springs spaced apart, a cradle extending beneath said differential casing and pivotally suspended from said studs, said cradle rigidly supporting said leaf springs so that they swing as a unit.

6. A front wheel steer and drive unit for auto vehicles including a fifth wheel, a support for said fifth wheel, and wheel supports carried by said support, means to permit bodily tilting of said support on a single axis relative to said fifth wheel, flexible time members pivotally connected to said fifth wheel and to said wheel supports adapted to pivotally move under normal stress, and fixed means carried by said fifth wheel and co-acting with said tie members under excessive stresses for transforming further pivotal movement into flexion of said tie members in a direction to resist further tilting of said wheel supports out of their normal vertical plane.

7. A front wheel steer and drive unit for auto vehicles including a differential casing rotatable on a vertical axis, a member pivotally mounted upon said differential casing at a point unequally distant from the ends of said member to swing on a single axis at a right angle to the axis of rotation of said differential casing, bearing blocks carried by said member, articulated axle shafts extending from said differential casing and journalled in said bearing blocks, and vehicle wheels carried at the ends of said shafts adjacent said bearing blocks.

8. A fifth wheel construction for front wheel steer and drive units including a fixed member, and a differential casing, the latter functioning as the rotatable member, said fixed member having a portion telescoping within said differential casing and forming a seat for a bearing, a collar connected to said fixed member and surrounding said differential casing and forming a housing for a bearing, said fixed member and said collar being spaced apart, a second collar unitarily associated with said differential casing and having lateral extensions projecting from the space between said fixed member and said bearing housing, means on said differential casing and extensions for the pivotal attachment of resilient members, and means for rotating said differential casing.

In testimony whereof I have hereunto set my hand.

CLIFFORD M. MARSH.